United States Patent [19]

Gibson, Jr.

[11] Patent Number: 5,161,669
[45] Date of Patent: Nov. 10, 1992

[54] FLEXED RESILIENT BELT WIPER BLADE FOR WIPING CLINGING MATERIAL FROM THE SURFACE OF MOVING CONVEYOR BELTS

[76] Inventor: William H. Gibson, Jr., c/o Ms. Connie Ferguson, Rte. 1, Box 47C, Oakhill, W. Va. 25901

[21] Appl. No.: 868,325

[22] Filed: Apr. 14, 1992

[51] Int. Cl.$^5$ .............................................. B65G 45/00
[52] U.S. Cl. ..................................... 198/499; 15/256.5
[58] Field of Search ............. 198/499, 497; 15/256.5, 15/256.6

[56] References Cited

U.S. PATENT DOCUMENTS

| | | | |
|---|---|---|---|
| 4,349,098 | 9/1982 | Veenhof | 198/499 X |
| 4,498,577 | 2/1985 | Veenhof | 198/499 |
| 4,662,507 | 5/1987 | Veenhof | 198/499 |
| 4,696,388 | 9/1987 | Stoll | 198/499 X |
| 4,703,845 | 11/1987 | Veenhof | 198/499 |
| 4,821,867 | 4/1989 | Veenhof | 198/499 |
| 4,836,356 | 6/1989 | Mukai et al. | 198/499 |

FOREIGN PATENT DOCUMENTS

1239052  6/1986  U.S.S.R. ............... 198/499

*Primary Examiner*—D. Glenn Dayoan
*Attorney, Agent, or Firm*—Sughrue, Mion, Zinn, Macpeak & Seas

[57] ABSTRACT

An elongated spring member such as a leaf spring which is normally flat in a relaxed state, is a bowed by compression between opposite ends and pressed into surface contact with a endless conveyor belt to scrape the belt during belt movement under considerable pressure such that the central portion of the spring member flattens against the belt under self-bias to maintain an edge of the spring member in intimate contact with the moving conveyor belt for scraping of debris clinging to the surface thereof. The spring member may have integral loops for added resilience to permit the central portion of the spring member to ride over lumps on the belt which are not dislodged during belt movement over the scraper. One or more elongated spring members may be employed in an assembly which is moved towards and away from the belt surface to provide selective contact between the bowed central portion of the elongated spring member and the belt. A flexible block of material which may or may not be resilient, and which imbeds the elongated spring member over the central portion has an edge of the block in contact with the belt and functioning as the scraper with the block conforming to the bowing of the elongated spring member embedded therein.

25 Claims, 6 Drawing Sheets

FLEXED RESILIENT BELT WIPER BLADE FOR WIPING CLINGING MATERIAL FROM THE SURFACE OF MOVING CONVEYOR BELTS

FIELD OF THE INVENTION

This invention relates to belt scrapers, and more particularly, to an arcuately flexed, resilient belt wiper blade of solid or tubular construction which is self-biased into contact over the complete surface or a portion of the surface of a moving conveyor belt and which, under the self-bias, flattens over that surface portion to ensure intimate contact with the moving conveyor belt and improved scraping of clinging material from the surface thereof.

BACKGROUND OF THE INVENTION

Endless conveyor belts, particularly those involved in removing particulate material such as grain, dirt, etc., utilize single or multiple belt scrapers, normally positioned so that the longitudinal axis of the scraper extends generally transversely across the bottom surface of the endless conveyor belt bottom run. The scraper, in contacting material clinging to that bottom surface, releases the material from the belt surface which falls by gravity into a collecting area beneath the belt at the location of the scraper.

Many belt scrapers consist of one or several scraper blades supported by an apparatus which includes some type of biasing means for pressing the edge of the scraper blade into contact with the surface of the belt to be scraped. Such apparatus may be of the weight applying counter-balance type, rotating spring type or linear biasing type. The various types have certain advantages, but some disadvantages, depending on the environment of use, material to be scraped, type of blade, width of belts, etc. Many of these belt scrapers are fairly complicated and relatively expensive. As may be appreciated, during use, in spite of the bias employed to maintain the edge of the scraper blade in contact with the surface of the belt, the scraper blade may be worn unevenly, and it is difficult to maintain the scraper blade (or multiple scraper blades of sectional form) in edge contact with the belt sufficient to ensure a nearly 100% removal of the clinging material during belt movement across the edge of the blade or blades.

U.S. Pat. No. 4,987,993, issued Jan. 29, 1991, is representative of the state of the art and utilizes a leaf spring as a biasing means for biasing a separate scraper blade member towards and away from the belt to be cleaned. The belt scraper of that patent utilizes an elongate frame defining an elongate aperture, with the blade member guided for movement within and transversely of the aperture so as to move towards and away from the belt to be cleaned. Mounting means are provided in the vicinity of the ends of the frame for mounting the frame relative to the belt. A spring support pivotally connected to the frame bears a spring which engages the scraper blade member and in turn presses it outwardly of the aperture towards the belt being cleaned.

While such arrangement is fairly simple, the blade is, at most, contacted at two positions over the length of the blade by the leaf spring and there is no assurance that the blade edge opposite to that being contacted by the spring will engage the belt over the full length of the blade. Further, since the scraper blade is physically separate from the biasing spring, dirt and/or water entering the area interferes with the free movement of the blade relative to its support, and indeed the blade relative to the spring, increasing the likelihood of uneven spring biasing force application to the movable blade and tilting of the blade relative to the surface of the moving belt, with attendant jamming.

DESCRIPTION OF PREFERRED EMBODIMENTS

Figure 1:
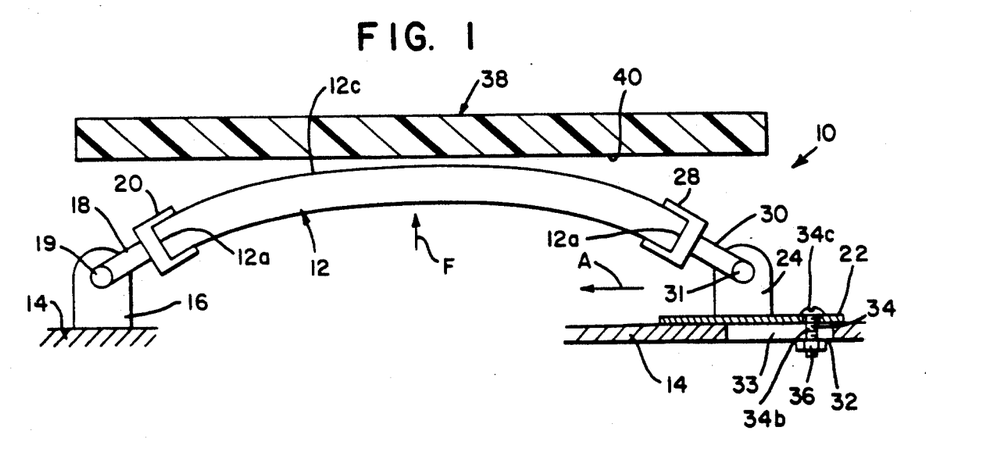
FIG. 1 is a front elevational view of a first embodiment of a self-biased, resilient belt wiper blade of the present invention prior to belt contact.
Figure 1A:
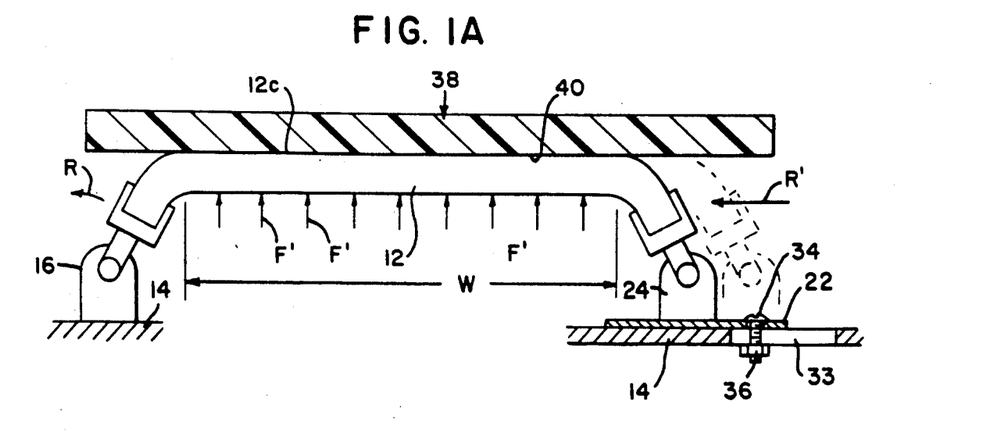
FIG. 1A is a similar view to FIG. 1 with the wiper blade self-biased into belt contact during normal wiping action.

A self-biased, resilient belt wiper blade forms the principal element of a belt wiper blade assembly or apparatus 10 in FIG. 1 under semi-relaxed conditions and is shown under self-biased, belt contacting conditions at FIG. 1A.

The belt wiper blade assembly or apparatus 10 consists principally of a self-biased, resilient belt wiper blade indicated generally at 12, in this case in the form of a straight metal spring, preferably formed of spring steel, and having a length on the order of the lateral width of a lower run of an endless conveyor belt 38 whose lower surface 40 faces the upper edge 12b of the resilient belt wiper blade 12. Opposite ends 12a of the blade 12 are captured within respective cups 20, 28. Cup 20 is fixed to an end of a rotatable arm 18. The end of arm 18, opposite the cup 20 is pivoted by a pivot pin 20a on a upstanding vertical bracket 16 which is fixed to an underlying fixed frame 14. To the right, wiper blade 12 has an end 12a captured within a second cup 28, which is likewise fixed to a rotatable arm 30. Arm 30 is pivotally coupled by means of a pin 31 to a bracket 24 fixed to a sliding plate 22 which is longitudinally movable on the underlying frame 14. Frame 14 includes an elongated slot 33 within which slides a bolt 34 whose headed end 34a abuts the slide plate 22 and whose threaded shank 34b extends through the slot. The slot is relatively narrow and narrower than a nut 36 threaded onto the end of the shank 34b projecting below the slot 33. By loosening and tightening the nut 36 on bolt 34, the slide plate 22 may be shifted towards and away from fixed bracket 16 and locked at a desired position.

By moving the slide plate 22 to the left, from the position shown in FIG. 1 to the position shown in FIG. 1A, a force develops on the resilient belt wiper blade 12 causing it to bow upwardly as shown in FIG. 1A. As a result, the upper edge 12b of the belt wiper blade contacts the lower surface 40 of the endless belt and the center of the resilient spring steel belt wiper blade 12 flattens as shown in FIG. 1A such that there is continuous contact between the upper edge 12b of the blade 12 and the bottom surface 40 of the belt over a major width W of the belt 38. This is the result of the compressive forces acting on the opposite ends 12a of the resilient belt wiper blade 12, the result of which is uniform force application over the width W of the blade 12 as indicated by the multiple arrows F', FIG. 1A.

The nut 36 is tightened down on the bolt 34 to lock the slide plate 22 in the position shown in FIG. 1A, thus maintaining excellent surface contact of the blade 12 uniformly across the lateral width of the belt 38 to the extent indicated by dimension W. Thus, forces applied to the steel spring wiper blade 12 causes that blade to flex and self-bias the upper edge 12b of the wiper blade 12 into flattened contact with the bottom surface 40 of the belt 38 uniformly over the lateral or transverse extent of that belt. Normally, the blade 12 is at right angles to the longitudinal direction of movement of the belt over the upper surface 12c of the blade. The blade 12 in the embodiment of FIG. 1 is rectangular in cross-section, as per FIG. 4, the cross-section of such wiper blade may be triangular, with the apex edge of the triangular cross-sectional blade in contact with the bottom surface 40 of the belt, or alternatively, round or oval.

Figure 2:
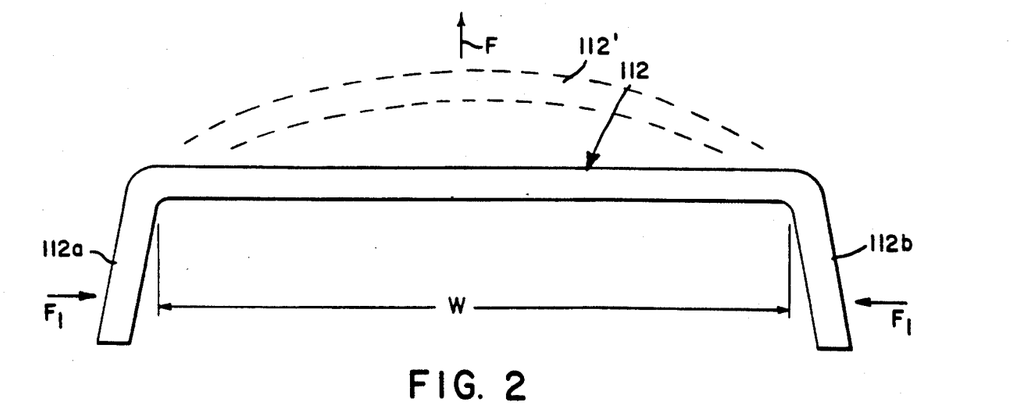
FIG. 2 is a front elevational view of a self-biased, resilient belt wiper blade forming a second embodiment of the invention.

Referring to FIG. 2, an alternative form of self-biasing, resilient belt wiper blade 112 is illustrated, in which blade 112 is shown under relaxed conditions, without force application, in full lines. However, instead of the blade 112 being a straight blade, blade 112 has opposite ends which are bent obliquely downwardly at an angle of approximately 80° to the axis of the center of blade forming legs 112a. Under such conditions, when oppositely acting compressive forces $F_1$ are applied against respective legs 112a, inherently the blade irrespective of its cross-sectional configuration, flexes upwardly at the center as indicated by the dotted line position 112' of the central portion blade 112, whereby a resilient force F as indicated by the arrow F at the center may be applied to the bottom surface of an endless conveyor belt such as the bottom surface 40 of conveyor belt 38, FIGS. 1, 1A. Likewise, upon contact with the bottom surface of the moving belt, as additional pressure is exerted tending to compress or move the legs 112a, 112b towards each other, FIG. 2, the bowed central portion of the blade 112 between the legs 112a flattens out, with the upper surface or edge thereof self-biased in full, uniform surface contact with at least a transverse portion of the belt 38, across its width.

Figure 3:
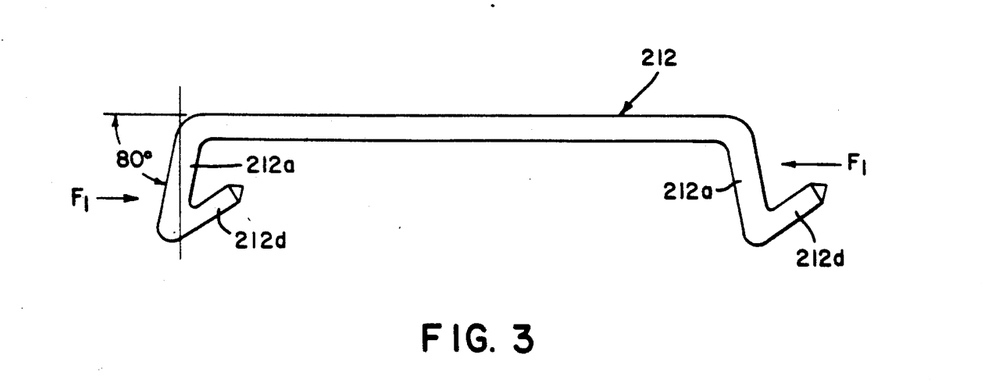
FIG. 3 is a perspective view of a self-biased, resilient belt wiper blade forming yet another embodiment of the invention.
Figure 3A:
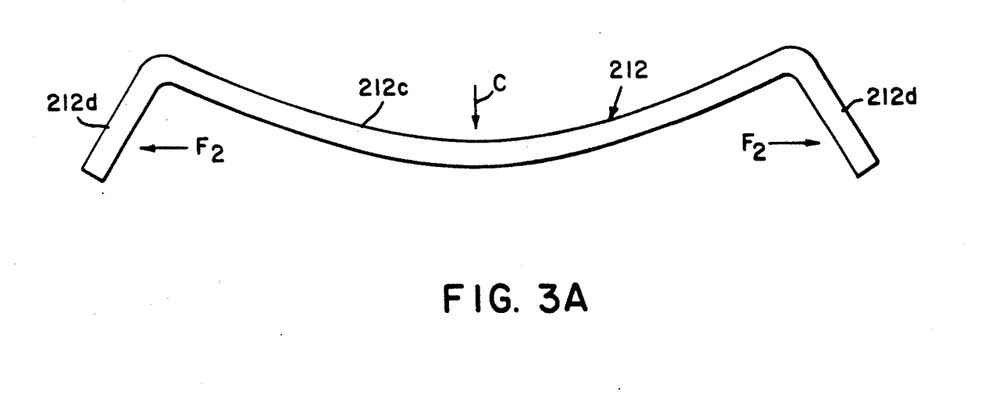
FIG. 3A is a top plan view of the embodiment of FIG. 3 in which the center of self-biased, resilient belt wiper blade is flexed in the direction of travel of the belt.
Figure 3B:
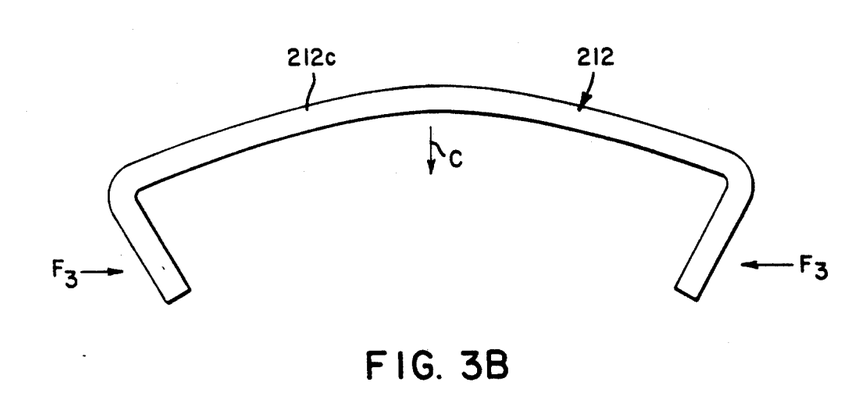
FIG. 3B is a top plan view of the belt wiper blade of FIG. 3 in which the center of the blade is self-biased in a rearward direction in opposition to the direction of movement of the belt.

Reference to FIG. 3 shows yet another embodiment of the self-biasing, resilient belt wiper blade of the present invention. In this case, blade 112 may be formed of a triangular shaped cross-sectional piece of spring steel having a pair of oblique legs 212a, connecting the two legs 212a, but extending downwardly and laterally outwardly at an angle of approximately $\alpha = 80°$. Further, the legs terminate in a right angle rearwardly projecting feet 212d of short length, and generally in a plane common with legs 212a. indicated by arrows $F_2$ in directions opposite to each other from the interior of the feet 212d, away from each other, the result is to deflect the central portion 212c of the blade when underlying an endless conveyor belt such as belt 38, FIG. 1, in the direction of conveyor belt movement as indicated by arrow C, FIG. 3A. To the contrary, if compressive forces $F_3$, FIG. 3B, are applied to the feet 212b in the direction towards each other from outside the feet 212b, the portion 212c of the blade between the legs 212a is flexed rearwardly in a direction reverse to the direction of belt movement again as evidenced by arrow C.

Figure 4:
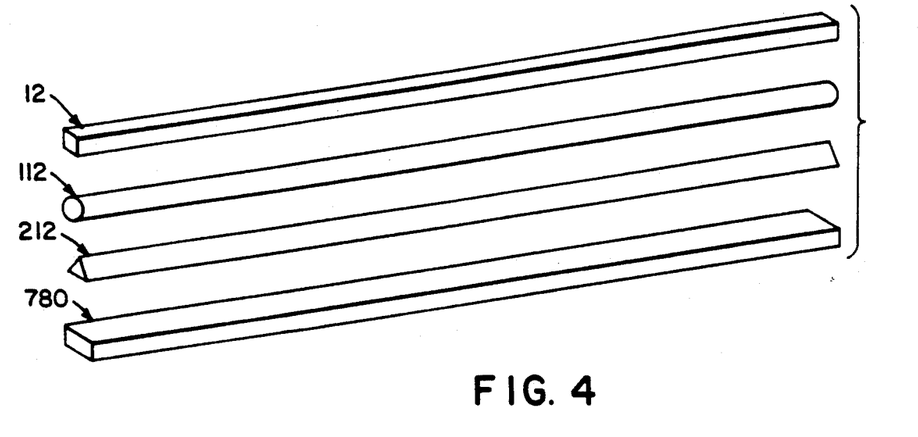
FIG. 4 is an exploded perspective view of four different cross-sectional wires forming the self-biased, resilient belt wiper blades of FIGS. 1, 2, 3 and 10 respectively.
Figure 8:
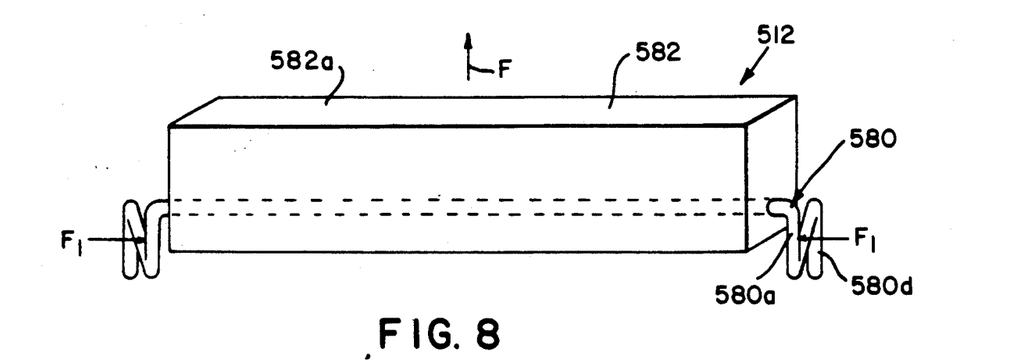
FIG. 8 is a perspective view of a self-biased, flexible, rectangular, strip form belt wiper blade of the wire embedded type forming yet another embodiment of the invention.
Figure 9:
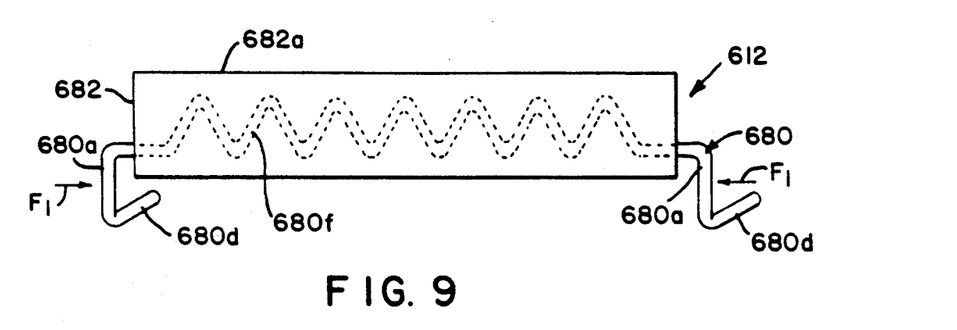
FIG. 9 is a front elevational view of another form of an embedded type, self-biased, resilient belt wiper blade.
Figure 10:
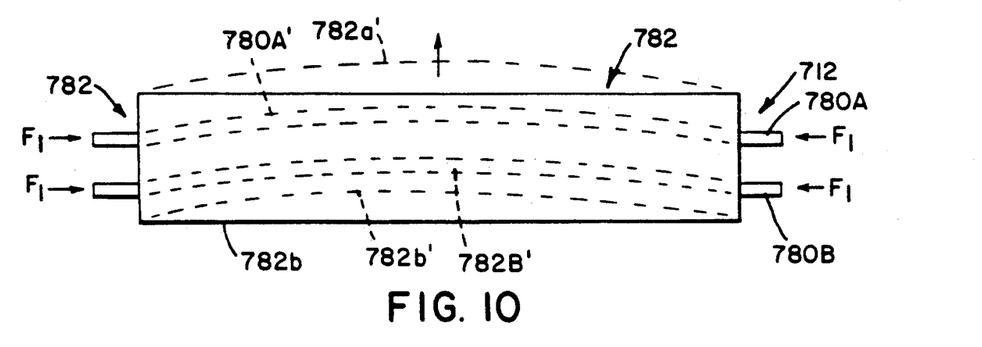
FIG. 10 is a top plan view of an embedded type, self-biased, resilient belt wiper blade, forming yet a further embodiment of the invention.

FIG. 4 is an exploded perspective view of a stack of straight steel wire stock pieces employed in the forming of the various embodiments of the self-flexed, resilient belt wiper blades as per FIGS. 1, 2, 3, 5, 6 and are employed in the embedded form type wire of wiper blades FIGS. 8, 9 and 10. The stock pieces shown as oval, circular, triangular and square (rectangular) in cross-section are given numeral designations 12, 112, 212 and 780, respectively from top to bottom and are employed in the formation of the blades or blade assemblies of FIGS. 1, 2, 3 and 10, respectively.

Figure 5:
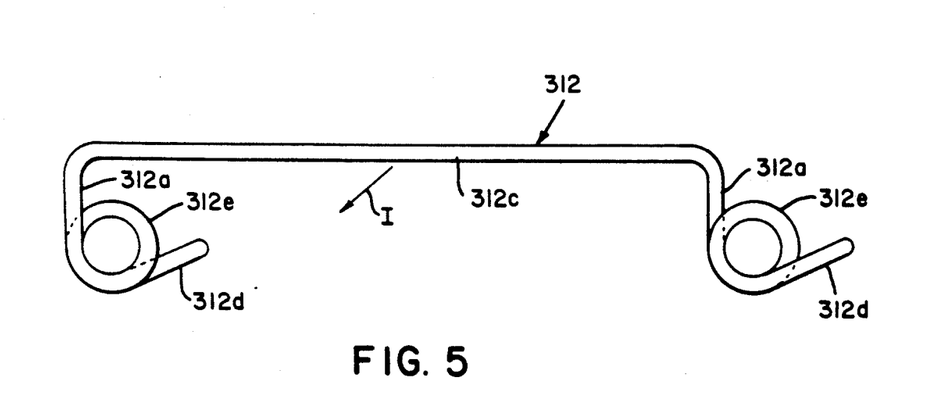
FIG. 5 is a perspective view of yet another embodiment of the self-biased, resilient belt wiper blade of the present invention.

Turning to FIG. 5, that figure illustrates yet another self-biased, resilient belt wiper blade indicated generally at 312, forming yet a further embodiment of the invention and having an integral loop portion 312e which is intermediate of each leg 312a and a foot 312d of that member. The purpose of the loops 312e at opposite ends of the blade is to give additional resilience and flexibility to the blade 312 so that, upon impact against a foreign deposit on the bottom surface of a moving conveyor belt such as belt 38, the loop 312c provides the resilience so that the blade can deflect in the direction of movement of the belt and ride over the clump or other accumulation on the bottom of the belt, if it is incapable of dislodging the same. The plane of each loop 312e is, as per the perspective view, in the same plane as a leg 312a and a foot 312d thereof, so that the central portion 312c of the unitary spring steel blade can move in the direction of arrow I parallel to the direction of belt movement as per arrow B, FIG. 7, which illustrates a self-biasing, resilient belt wiper blade assembly 310 forming yet another embodiment of the invention and utilizing two of the resilient belt wiper blades 312 of FIG. 5, spaced slightly from each other and oriented transversely to the direction of movement of the endless conveyor belt 38 in that embodiment.

Figure 6:
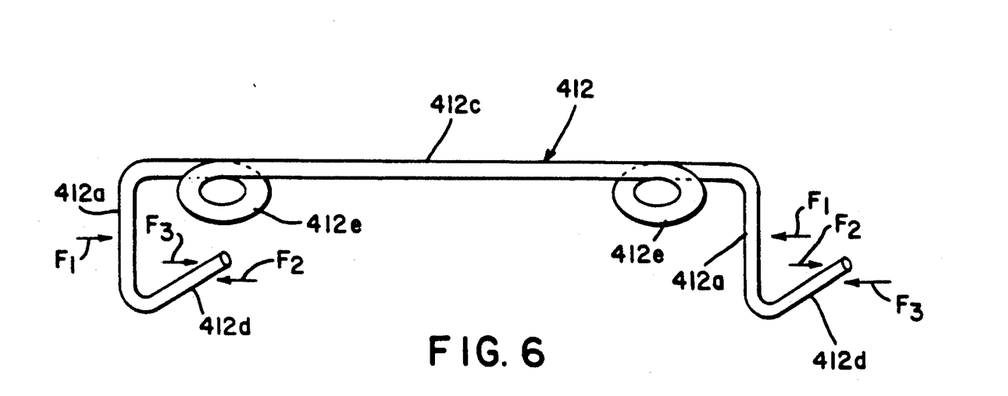
FIG. 6 is a perspective view of a self-biased, resilient belt wiper blade forming yet another embodiment of the invention.

Turning next to FIG. 6, a further embodiment of the self-biased, resilient belt wiper blade is illustrated as having a circular cross-sectional configuration conforming to that at 112, FIG. 4, insofar as the steel wire stock is concerned. In this case, the embodiment has integral loops 412e within the central portion 412c of the blade 412 adjacent the legs 412a at opposite ends of the blade. The legs 412a terminate in integral right angle feet as at 412d. All other aspects are similar to the embodiments of FIGS. 3 and 5, that is the applying of forces such as forces F1 to the legs 412a from the opposite ends of the spring steel wiper blade 412 causes the center 412c of the blade to flex upwardly in an arc between the integral coils or loops 412e. Applying forces to the feet in opposite directions from the interior of the blade structure laterally outwardly, in accordance with arrows F2, causes the center 412c of the blade to flex forwardly in the direction of conveyor belt movement, while the application of forces F3 from the outside of the legs 412d towards the inside of the blade structure causes the central portion 412c of the blade 412 to deflect rearwardly opposite to the direction of belt movement similar to that occurring at arrow C, FIGS. 3A, 3B.

Figure 7:
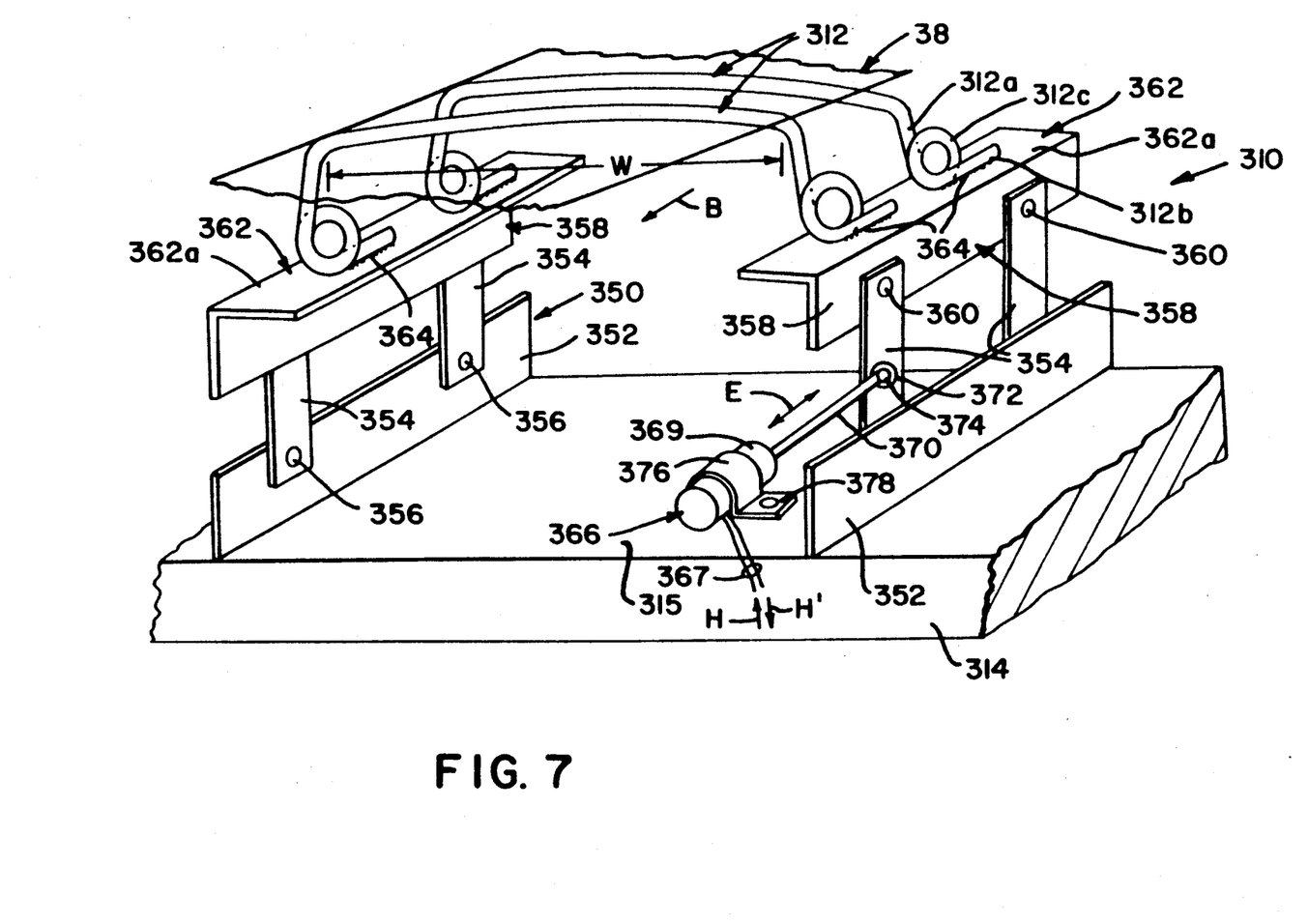
FIG. 7 is a perspective view of the belt scraper apparatus utilizing two side-by-side belt scraper blades in accordance with the embodiment of FIG. 5 forming a further embodiment of the invention.

As may be appreciated in the various embodiments, it should be readily apparent that the forces F1, F2 and F3 may be applied to the resilient spring steel belt wiper blades (or their structural equivalents) by various mechanisms such as that of the embodiment of FIG. 7. Also, in the more simplified forms, the ends of the unitary spring steel or like metal resilient belt wiper blades may be welded to a base, frame or like fixed support beneath the conveyor belt lower run, with the blades facing the bottom surface of the conveyor belt and in uniform contact therewith over the major part, if not all, of the bottom surface of that belt, in which case the arced central portion of the wiper blade is flattened against its self-bias by the contact with the tensional belt and with the belt flattening the upward convex curvature of the blade central portion. By fixing the position of the underlying support for the feet to opposite ends of the blades such as blades 312 and 412 in FIGS. 5 and 6 and providing sufficient compressive force on opposite ends of the blades, i.e. via legs 312a and 412a for those embodiments, the feet may be then welded to an underlying support. Pressure is then constantly exerted against the bottom 40 of the belt 38 irrespective of whether the belt is running or not and whether under load or not, and accumulating dust or other particles which are readily removed for efficient load handling and a reduction in the energy necessary to operate the conveyor belt system during belt movement over the flattened blade.

However, it is not necessary that one or more wiper blades be in continuous contact with the belt. Reference to FIG. 7 shows a typical mechanism for maintaining a pair of side-by-side resilient spring steel belt wiper blades 312 in contact with the bottom surface 40 of belt 38 or selectively moved out of contact therewith. A fixed horizontal base member 314 is illustrated as underlying an endless conveyor belt 38 which is moving in the direction of arrow B at right angles to the base 314 which may be a wooden beam or the like. Base 314 fixedly mounts a pair of horizontal angle bars 352 by means of screws, bolts or the like. Extending upwardly from each of the pair of spaced angle bars 35 are a pair of pivotable arms 354 which are pivotably coupled, at their lower ends by pins 356 to the angle bars 352, and at their upper ends by pins 360 to angle bars 362. The pairs of angle bars 352, 362, and the paired arms 354 form a conventional parallelogram structure 358 for supporting the upper angle bar 362, but permitting angle bar 362 to move up and down relative to base member 314. In this case, the feet 312d of the pair of self-flexed, resilient belt wiper blades are welded at 364 to the horizontal top surface 362a of respective angle bars 362 while compression forces are applied to opposite legs 312a of the blades, and with the central portion 312c of the blades flexed into an arc upwardly in the direction of the bottom surface 40 of the belt 38. The angle bars 362 are maintained at a desired raised position such that the arced central portions 312 of the blades 312 are flattened as shown in FIG. 7 and in full surface contact with the belt 38 over the major portion, if not all, of the bottom surface 40 of that belt. Such contact is over a lateral width W, FIG. 7. However, as desired, the movable angle bars 362 may be shifted in the direction of belt movement as per arrow B and by a linear actuator, in this case a hydraulic motor indicated generally at 366 to cause the blades 312 to engage belt 38 or oppositely to disengage the belt. The motor is constituted by cylinder 368 having internally a piston (not shown) which moves longitudinally within the cylinder by application of hydraulic fluid into the cylinder in accordance with arrow H and removed therefrom in accordance with arrow H' through paired tubes or hoses 367. A U-clamp 376 fixedly mounts the cylinder 368 to the top of the base 314. In this schematic representation, a piston is coupled to a piston rod 370, which rod extends outwardly of one end of cylinder 368 and is pivotably connected by pin 374 to one of the arms 354 such that extension and retraction of the hydraulic cylinder piston in accordance with arrow E raises and lowers the angle bars 362.

As may be appreciated, a similar type mechanism may be fabricated using the various self-biased, resilient belt wiper blades in accordance with the various embodiments of the invention as described here and before. It should be kept in mind that the term "self-biased" has to do with the spring property of the blade itself to flex into an arc and to flatten out upon contact with the flat bottom surface 40 of the belt 3B. The spring pressure applied belt 38 is under considerable tension during operation, particularly when carrying heavy loads of grain, sand, dirt, etc. The belt contact results in a flex of the wiper blade from its arced configuration, as per FIG. 1 for instance, into a flattened condition in full and uniform surface contact with the bottom surface 40 of the belt 38, whether achieved in the manner of FIGS. 1, 1A or in the manner of FIG. 7 as an example. Such apparatus of FIGS. 1 and 7 are exemplary only of various ways to insure simplified wiping of the belt.

In FIG. 8, a first of several embodiments is illustrated in which the central portion of the resilient, spring wire or other leaf spring member is embedded or encased in a mass of resilient material capable of flexing along with the steel or like spring element whose central portion is embedded in such mass. In FIG. 8, the self-biased, resilient belt wiper blade, indicated generally at 512, consists of a spring steel member 580 having integral legs 580a at opposite ends, terminating in right angle integral feet 580d. That element may be identical to the blade 212, FIG. 3, however, in this case it is embedded in a mass of elastomeric material such as hard rubber block of a parallelepiped form, rather narrow, fore and aft and of extended height, with a length which is just short of the distance between the spaced legs 580a. The spring steel member over a major portion of its length is thus embedded within a resilient mass capable of flexing in an arc, allowing arc flexing of the spring steel member over its central portion and the rubber block 582, within which that portion of the spring steel member 580 is embedded. Block 582 provides a flat, upper surface or edge 582a which may readily contact a bottom surface as at 40 of a lower run of an endless conveyor belt 38. The upper surface 582a of the elastomeric block 582 flexes with the central portion of the spring member 580 and the composite structure performs the same function in the same manner as the other embodiments of the belt wiper blades described previously, with flexing predicated on the application of a force as at F1 acting on the opposite legs 580a to deflect the legs towards each other and force the central portion of the spring member 580 and its block upwardly in the direction of arrow F, FIG. 8.

A similar action and response occurs in the FIG. 9 embodiment. In the embodiment of FIG. 9, a spring steel member 680, which may be formed of spring steel stock such as anyone of the elements of FIG. 4, is provided centrally, between laterally opposed legs 680a, with a number of integrally formed convolutions 680f, the function of which is to unite the member 680 to the block 682, within which those convolutions 680f are embedded. In this case, the block 682 may be formed of a flexible ceramic material capable of flexing in an arc upwardly as a result of force application in the direction of arrows $F_1$ on legs 682 to opposite legs 680a of the composite structure. In this embodiment, similarly right angle feet legs 680d permit mounting or fixing to a base of the spring member 680 as well as the application of forces thereto, to cause flexing of the composite central structure forward or aft in the direction of or against the direction of a moving belt such as belt 38, FIGS. 1 and 7, when applied thereto.

FIG. 10 shows a similar composite self-biased, resilient belt wiper blade 712 as that at 512, FIG. 8, and wherein block 782 may be formed of hard rubber or other elastomeric material which is flexible if resilient. In any case, block 782 has embedded therein not one spring steel member, but two identical spring members 780A, 780B, which are spaced from each other and which overlie one another. The block is of parallelepiped form and has opposite top and bottom surfaces as at 782a, 782b. Upon flexing, as indicated by the dotted lines of all of the elements including the block 782, uniform convex arcing occurs for the composite blade 712, as a unit, intermediate of the ends of the two spring steel members 780a, 780b, the result of which is to apply a force emanating from the spring steel members 780a, 780b as result of compressive forces shown by arrows $F_1$ acting on those elements from opposite ends to effect that flexure. When employed in an apparatus such as that shown at 10 in FIG. 1, or at 310 in FIG. 7, the top of the elastomeric block 782 will flatten between its ends in the same manner as the single blade 12 in the embodiment of FIG. 1 and the dual side-by-side blades 312 in the embodiment of FIG. 7 against the bottom surface of a moving block to wipe the same.

It should be kept in mind that in the various embodiments of the invention as described above, the belt wiper blade may be of solid or tubular construction, may be constructed of any flexible material, whether spring steel, a metal alloy or a composite capable of being flexed and have a degree of resilience so as to function as a spring. The wiper blade, whether unitary, or composite as in FIGS. 8, 9 and 10, must move into an arc, i.e. bow, so as to flatten against the belt to ensure uniform and continuous contact with the bottom surface of the conveyor belt or like belts, even upon wear of the belt or the wiper blade.

Generally, the blade may be of any cross-sectional shape including but not limited to circular, rectangular, triangular, cross-sectional configurations, whether straight or twisted and or whether embedded within other flexible materials or not, capable of being bowed in one or in multiple directions orthogonal to each other. The blade is normally set at right angles to the direction of belt movement of the conveyor belt or its equivalent, however, it may cross at a given angle to the direction of movement, other than 90°. The mounting of the blade itself may by welding in fixed leg or end position, or by clamping or otherwise appropriately fastening opposite ends to a fixed underlying base structure with the bowed central portions facing and flattened against the bottom surface of the lower run of an endless conveyor belt. Alternatively, the blade and its support structure may be inverted and contact the upper surface of the endless belt top run, if such is necessary or desirable. Preferably, the amount of arc or bow of the unitary or composite wiper blade is adjustable to take up for wear, or shift in position of the belt or the blade support apparatus. For relatively large width belts, multiple apparatuses having blades in a line or in sections extending transversely across the moving belt ensure wiping of the belt over the full lateral extent of the same.

The invention is not limited to the precise constructional details shown in the drawings and described above, and modifications may be made thereto, other embodiments will become apparent from the described embodiments and suitable combinations of features of the embodiments may be made without departing from the spirit of the invention or the scope of the claims appended hereto.

I claim:

1. A belt scraper for scraping accumulated debris from a surface of an endless conveyor belt by pressing contact between the scraper and the belt during belt movement across an edge of the scraper, said belt scraper comprising:

an elongated spring member including a normally flat portion in a relaxed state positioned in juxtaposition to the surface of the moving conveyor belt, and said spring member being bowed into place by compression between opposite ends into surface contact between opposite ends thereof into surface contact with said belt with a central portion of said spring member flattened against the belt over the extent of the bowed portion of the spring member with the central portion of the spring member under self-bias, maintained in intimate contact with the moving conveyor belt for improved scraping of debris clinging to the surface thereof.

2. The belt scraper as claimed in claim 1, wherein said elongated spring member comprises a leaf spring.

3. The belt scraper as claimed in claim 2, wherein said leaf spring is of circular cross-section.

4. The belt scraper as claimed in claim 2, wherein said leaf spring is of rectangular cross-section.

5. The belt scraper as claimed in claim 2, wherein the leaf spring is of triangular cross-section with an apex edge of the triangular cross-section spring member in surface contact with the belt.

6. The belt scraper as claimed in claim 2 wherein the leaf spring is of oval cross-section.

7. A belt scraper as claimed in claim 1, wherein said elongated spring member comprises integral legs at opposite ends thereof extending outwardly from the central portion of the spring member such that compressive force is applied to the legs, in directions towards each other, bows the central portion outwardly of the legs, away from the legs to provide a self-biasing force of the elongated spring member central portion into surface contact with the belt.

8. The belt scraper as claimed in claim 1, wherein the elongated spring member extends generally transverse to the direction of movement of the endless conveyor belt.

9. The belt scraper as claimed in claim 1, further comprising a block of flexible material embedding said elongated spring member intermediate of the end over at least a major extent of the central portion of said elongated spring member, and wherein, said block includes an edge facing said moving belt for contact therewith and said edge conforms to the flattening of the spring member under the self-bias of the spring member pressing the block into surface contact with the endless conveyor belt.

10. The belt scraper as claimed in claim 9, wherein the block consists of a resilient material.

11. The belt scraper as claimed in claim 9, wherein said block comprises an elastomeric block molded about said elongated spring member central portion.

12. A belt scraper as claimed in claim 10, wherein said block consists of a resilient ceramic material.

13. The belt scraper as claimed in claim 9, wherein said block consists of a composite material.

14. The belt scraper as claimed in claim 1, wherein said elongated spring member includes integrally, to each side of the central portion at respective opposite ends, loops in a plane common with said central portion to increase the resiliency of the elongated spring member and to permit the edge in contact with the surface of the belt to be deflected in a direction parallel to the direction of movement of said endless belt and to ride over any accumulate debris which is not dislodged from the belt surface upon debris impact with the elongated spring member central portion.

15. A belt scraper as claimed in claim 7, wherein said integral legs terminate, respectively in feet, extending generally at right angles to the legs, such that forces applied to respective feet in directions towards each other, or away from each other effect bowing of said elongated string member central portion in the direction of movement of the belt or in a direction opposite the direction of the belt, respectively.

16. The belt scraper as claimed in claim 1, wherein said elongated spring member comprises a metal spring wire.

17. The belt scraper as claimed in claim 15, wherein said loops are formed within the integral legs, between the feet and the elongated spring member central portion.

18. A self-biasing belt scraper assembly for scraping accumulated debris from a surface of an endless conveyor belt by pressing contact with said surface of the belt, said apparatus comprising: a fixed support surface facing said conveyor belt and extending across the belt generally at right angles to the direction of belt movement, a elongated spring member including a normally flat portion in a relaxed state positioned on said fixed support surface, a means for fixing opposite ends of said elongate spring member, with said spring member bowed into place under compression between opposite ends into surface contact with said belt with the central portion of the spring member flattened against the belt over the extent of the bowed portion of the spring member and with the central portion with the flattened central portion of the spring member under self-biased maintained in intermit contact with the moving conveyor belt surface for improved scraping of debris clinging to the surface thereof.

19. The belt scrapper assembly as claimed in claim 18, wherein a bracket is affixed to one side of said belt, on said fixed surface, a cup is mounted to the bracket and receiving one end of said elongated spring member, a second bracket is mounted to the opposite side of the moving endless conveyor belt and in line with the first bracket, said second bracket having a cup mounted thereto and receiving the opposite end of said elongated spring member, said second bracket being fixed to a slide plate slidable on said fixed support surface, and means for fixedly locking said slide plate at varying positions relative to said first bracket for placing said elongated spring member under compression to bow the central portion of the spring member against the bottom surface of the belt such that the central portion of the spring member is flattened against the belt under the self-bias created by the compression applied between opposite ends of the elongated spring member.

20. The belt scraper assembly as claimed in claim 19, wherein said cups are mounted to respective brackets by pivotable arms such that the cups are aligned with the ends of the elongated spring member during bowing of the central portion of said spring member.

21. The belt scraper assembly as claimed in claim 18, wherein a pair of parallelogram support mechanisms are mounted to the said fixed support member underlying said endless conveyor and facing the same, at laterally spaced positions with respect to said endless conveyor belt, wherein said elongated spring member has opposite ends fixed to respective parallelogram mechanisms with said elongated spring member under compression between opposite ends thereof such that the central portion of said spring member is flattened against the belt over the extent of the bowed portion of the spring member and with the central portion of the spring member under self-biased maintained in intimate contact with the moving conveyor belt over the portion of the belt with which the central portion is in contact and wherein, said belt scraper assembly further comprises means for simultaneously adjusting the positions of the parallelogram mechanisms of the belt wiper blade support mechanisms to raise and lower the belt wiper blade with respect to the facing surface of the endless conveyor belt for effecting contact therebetween and removing said blade from contact with the belt, and for variably flattening the central portion of the spring member.

22. The belt scraper assembly as claimed in claim 21, wherein each of said parallelogram mechanisms comprises a first angle bar fixedly mounted to said fixed support surface, and extending parallel to the direction of belt movement, a pair of arms pivotably mounted at one end to respective ends of said first angle bars and pivotably mounted at opposite ends to opposite ends of respective second angle bars and wherein, said elongated spring member has opposite ends thereof fixedly mounted to respective second angle bars and extending between said second angle bars.

23. The belt scraper assembly as claimed in claim 20, wherein said elongated spring member comprises: a metal spring wire including integral legs at opposite ends, said legs being welded at ends remote from the central portion of said elongate spring member to respective second angle bars with said central portion of the elongated spring member metal spring wire bowed upwardly towards said conveyor belt surface.

24. The belt scraper assembly as claimed in claim 22, wherein a second elongated spring member extends parallel to said elongated spring member comprises a first elongated spring member and said first elongated spring member is fixedly mounted at opposite ends to respective second angle bars and is bowed at a central portion thereof similar to that of the first elongated spring member.

25. The belt scraper assembly as claimed in claim 21, wherein said means for adjusting the position of the parallelogram mechanism comprises a hydraulic cylinder mounted to said underlying fixed support surface, said hydraulic cylinder including a piston rod extending outwardly of a cylinder and being pivotably coupled to one of said arms intermediate of the pivot connections between said arm and said angle bars, and means for selectively supplying and removing hydraulic fluid to said cylinder such that the second angle bars are raised and lowered relative to said fixed support surface by extension and retraction of said hydraulic cylinder piston rod.

* * * * *